INVENTORS.
JOHN R. STROM
HARVEY W. WEYRICK
BY Orland M. Christensen
ATTORNEY

[Patent 3,465,550 — Sept. 9, 1969]

United States Patent Office 3,465,550
Patented Sept. 9, 1969

3,465,550
CHROMATIC CONTROL OF BLEACHING PROCESS
John R. Strom, Seattle, and Harvey W. Weyrick, Vancouver, Wash., assignors to Systematix, Seattle Wash., a partnership of Washington composed of John R. Strom and Harvey W. Weyrick
Filed Dec. 3, 1965, Ser. No. 511,479
Int. Cl. D21c 7/12, 3/26; H01j 39/12
U.C. Cl. 68—13                                         9 Claims

ABSTRACT OF THE DISCLOSURE

The disclosed system for automatically controlling injection of an additive in a chemical process employs an electronically derived signal representing the color of material being processed in order to vary additive injection. The color signal is advantageously utilized to vary additive injection downstream of the color measurement location, and each alteration in the injection rate in response to color changes is automatically based on a reference level representing the immediately preceding setting of the additive injection rate.

---

This invention relates to a system for automatically controlling the injection of a chemical additive to a process by means including a multiple-band chromatic sensor for monitoring the color of stock in the process and means for varying additive injection in accordance therewith. While the invention is herein described in terms of a preferred form thereof, it will be recognized by those skilled in the art that certain modifications may be made without departing from the principal features involved.

In various industrial processes it is necessary to control the introduction of chemical additives to accommodate changes in treatability and other variables. The factors of process variables upon which control is necessarily based differ from process to process and affect the manner in which the process is controlled. For example, to measure and regulate consistency of stock in paper mills, differences in light transmission through the stock being processed have been used as an index for control. Light transmission characteristics may also be used to control other aspects of chemical processes such as the presence of certain gases in vapor or visible components in liquids affecting opaqueness and thus light transmission. Light reflecting characteristics of stock in processes may be used as a measure of surface texture, fibrousness, and other factors.

Other types of controls include one wherein a continuous electrolysis is performed on the process, the output of an electrolytic cell being employed to control concentration of certain chemical additives. Changes in the index of refraction of stock or a sample thereof have been monitored to sense changes in constituency by measuring the angle of refraction of a beam of light passed through the fluid stock at one or more points. Different elaborate feedback control systems have been devised based on such variables.

However, the above techniques can be improved upon where the color of the stock in the process is indicative of one of the aforementioned factors or where color itself is a critical factor. In some cases color can be used as a control index where in the past light intensity, absorption or index of refraction have been used. While color may affect light transmissivity or absorption of particular bands of wavelengths and may affect the index of refraction, light intensity (absorption) and refractometry measurements have not in the past been an accurate measure of color. Measurements have been taken, commonly, at a single wavelength or band of wavelengths indicating only major changes in the predominate color, or indicating only darkening or lightening of the stock which to the eye appear as changes in color. Moreover, certain process variables upon which the injection of additives should not be based affect the above types of measurements and interfere with process control. For example, the moisture content of stock or the presence of water vapor on the surface may affect both reflectivity and transmissivity, as well as the index of refraction. Further, many control techniques and instruments are affected unduly by changes in temperature, texture, viscosity, density and other non-critical temporary variations not intended as control factors.

It is a primary object of this invention to provide an improved industrial process control system for monitoring the color of stock moving through the system and which is substantially unaffected by such factors as temperature, texture, viscosity, moisture content or surface water vapor.

It is a further object hereof to provide a chromatic control system for industrial processes which is more accurate than previous techniques based on refractometry, reflectivity or transmissivity.

In the manufacture of pulp, as an example, process control has been typified by such crude practices as taking a hand sample of stock and performing chemical analysis thereon in a nearby laboratory, then altering the process in accordance with requirements revealed by the chemical tests. This inherently time-consuming technique is characterized by fluctuations in the result due to the ongoing action of the chemicals during the delay period. Nor is this general type of process involving relatively slow movement of stock through chemical reactions, washing steps, and the like, adaptable to a feedback type of control, since the additive injection point would have to be spaced upstream of the monitoring device a sufficient distance to permit chemical action to run its course in the interim. An adjustment would still leave a gap within which the additive had not operated and a consequent time lag for noting the affect of a change. Hence, it is a further object of this invention to provide a "feed forward" type of control wherein additive injection at a downstream point is regulated by the sensing instrument.

The present invention provides a method for controlling a process employing color as an index for additive injection to stock being advanced through the process, comprising the steps of directing radiant energy upon the stock as it is advanced past a fixed location in the process; sensing by a first radiant energy detector the intensity of radiation within a first narrow band of wavelengths radiating from the stock at such location; sensing by a second radiant energy detector the intensity of radiation within a second narrow band of wavelengths radiating from the stock at such location; generating electrical signals corresponding to such intensities, respectively; forming an electrical signal representative of a predetermined composite function, preferably a ratio, of the intensity signals; electrically comparing the function signal with a variable reference signal selectable from a predetermined scale of reference signal levels; injecting additive into the stock from a source of additive supply; automatically varying the rate of injection in accordance with the aforementioned comparison; and automatically selecting the level of the reference signal from the predetermined scale in accordance with variations in the rate of additive injection. When the process is characterized by the aforementioned time lag for chemical reaction, the supply or injection of additive to the stock is performed at a location downstream of the sensor location in feed forward fashion.

The process control system according to the invention includes means for directing radiant energy upon the moving stock at a fixed location in the process, a multiple-band chromatic sensor for sensing intensity of radiant energy emanating from the stock at such location within at least two different narrow bands of wavelengths and rendering a signal representing a predetermined function of the different intensities, thus representing color, and a process controller responsive to the color signal for controlling additive injection in accordance therewith. The process controller includes a reference voltage source having a predetermined scale of selectable output levels corresponding to predetermined rates of chemical additive injection, means for comparing the sensor output (color) signal with the reference voltage level and operable upon occurrence of predetermined relationships therebetween to render a control signal, variable additive injection means for supplying chemical additives to the stock, such injection means being responsive to the comparing means and operable to vary the rate of additive injection in accordance with the comparison made thereby, and means coupled to the reference voltage source and responsive to the additive injection means for selecting the reference voltage level on said scale in accordance with variations in the rate of additive injection.

The chromatic sensor comprises an optical system for directing received radiant energy to first and second detectors therein, the detectors including respectively different filter means operable to pass radiant energy at different bands of wavelengths and radiant energy sensitive electronic devices coupled therewith operable to produce electrical responses in accordance with the respective energy intensities passed, and output circuit means including a differential voltmeter responsive to the detectors and a feed back loop including a variable voltage supply operable to maintain the output of one of the devices constant whereby the voltmeter output represents a ratio of the electrical responses of the detectors. The measurement of radiant energy reflected or transmitted by the stock provides a more accurate measurement of color than heretofore possible. Further, generation of a ratio signal representing color provides a control signal which is substantially independent of many of the aforementioned factors such as moisture, texture, density, viscosity, etc., not intended to enter in as factors in process control, yet accurately indicative of chemical requirements such as bleach in the manufacture of pulp.

It is well known that light is composed of different wavelengths of energy, and that apparent color of light depends upon the relative intensities of various wavelengths present. Generally, all colors can be defined in terms of three primary colors, red, blue, and green light. While all three primary colors are normally required to describe all the other colors, a portion of the color spectrum can be described by use of only two colors. Thus the illustrated embodiments utilizes only two sensors and associated filters. While it is possible for an ambiguity to result, the colors giving identical indications from the sensor are located at opposite ends of the color spectrum, so that the probability of it presenting a problem by the occurrence of both colors in the same process is remote. However, if monitoring of the full spectrum of colors is desired, it is of course within the scope of the invention to use three or more detectors gauged by filters to different wavelengths representing at least the primary colors and controlling additive injection by two or more color signal outputs.

The radiant energy directed upon the stock moving past a fixed location in the system is preferably filtered by first and second color filters more closely defining the radiated wavelengths and providing a balance between their intensities in order to help balance the energy intensities received by the detectors.

The invention further resides in certain more specific features of the disclosed system, including means embodying a program for regulation of additive injection with reference to a multiplicity of predetermined process variables. These include flow rate, potential reaction of the stock to the chemical additive in question, strength or concentration of the chemical additive, surface conditions, temperature, and mechanical response of the regulating features themselves. The scale of automatically selectable reference voltage levels represents a carefully planned program establishing the required rates of additive injection taking such variables into consideration. Continuous alteration of the injection rate in response to color changes is based on a reference level representing the immediately preceding setting of the injection rate.

Moreover the programmed control scale is carefully adapted to each stage in a single process. In a typical pulp manufacturing process the initial brown stock or unbleached slurry is introduced into a series of bleaching towers wherein it is subjected to progressively more refined bleaching steps, and is subjected to a series of intervening washing steps between treatments in the towers. According to the present invention the color of the stock is monitored after certain of the washing steps and bleach is added immediately downstream of the monitoring points. Thus progressively more refined interrelated chemical additive controls at the different stages act continuously and automatically to monitor and regulate the entire process. At the same time, process performance at each control stage may be recorded for periodic observance of its behavior.

These and other features, objects and advantages of the invention will be further understood from the following more detailed description of the invention taken in connection with the accompanying drawings wherein a preferred embodiment is illustrated.

Figure 1:
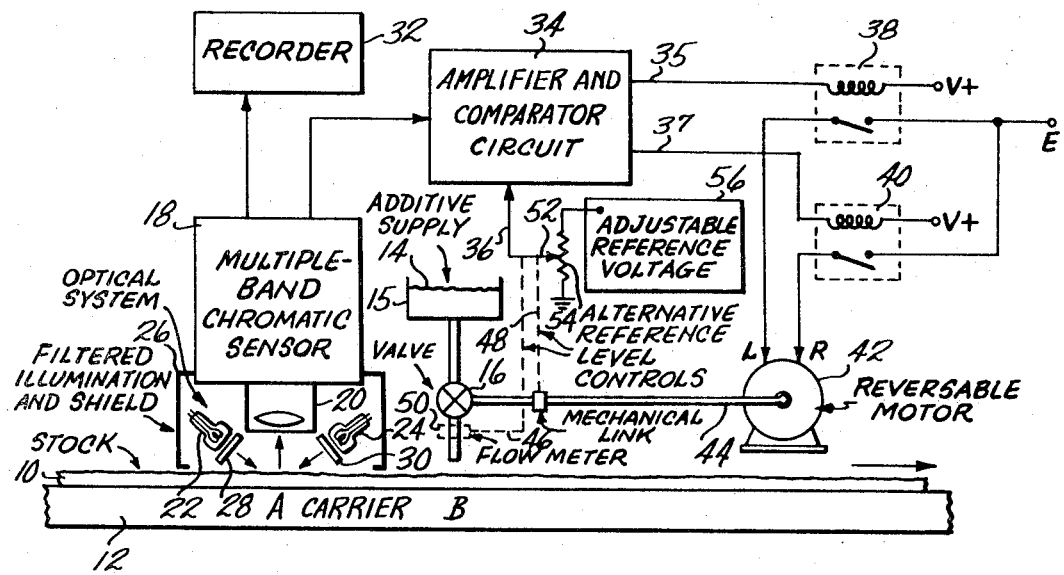
FIGURE 1 is a block diagram of a control system according to the invention including a multiple-band chromatic sensor and a servo system responsive thereto for controlling the supply of an additive to stock flowing in the process.

The block and schematic diagram in FIGURE 1 illustrates the elements of a control system for an arbitrarily selected process wherein a layer or web of stock 10 carried by a suitable means 12 for advancing the same through the process is treated chemically by an additive 14 contained in a supply vat 15 having an output valve 16 for injecting the additive into the stock at location B. The stock moving to the right is monitored at location A upstream of injection point B by multiple-band chromatic sensor 18 which detects in different wavelength bands radiant energy emanating from the stock into an optical system 20. The radiant energy originates in suitable illuminating lamps 22 and 24 mounted within the shield 26 which excludes ambient light from the illuminated portion of the stock. Optical filters 28 and 30 are included to balance and define the different bands of wavelengths of light directed to the stock.

The output signal of sensor 18 is applied to a suitable recorder 32 for periodical visual checks, as well as to provide a permanent record of process data. The same output signal of the sensor is compared in amplifier and comparator circuitry 34 to a variable reference voltage received at input terminal 36.

In circuitry 34 the amplified sensor output signal energizes either of first and second comparator circuits (not shown) connected to outputs 35 and 37. The first compaartor circuit actuates relay 38 and the second actuates relay 40 to connect alternatively operable windings of reversible motor 42 to a power supply E for turning the motor in clockwise or counterclockwise directions, depending on the polarity of the sensor output with respect to the variable reference level at terminal 36.

Reversible motor 42 is coupled by a suitable mechanical connection 44 to additive injection valve 16 whereby to vary the rate of injection of additive 14 in response to increases or decreases of the sensor output above or below the variable reference level. As the opening of valve 16 is altered by action of reversible motor 42, the variable reference level to the amplifier circuit is changed, by either of alternative reference level control linkages 46 and 48, until a balance is achieved between it and the sensor output signal.

A flow meter 50 of magnetic or other suitable type is provided for measuring additive flow downstream of the valve 16. Linkage 46 represents an operative coupling whereby the position of wiper 52 of potentiometer 54 is automatically altered in accordance with the flow meter indication. The voltage range of potentiometer 54 is set by manually adjustable reference voltage source 56 to establish the aforementioned scale of selectable reference voltage levels with which the amplified sensor output is compared to determine the necessary change in the rate of additive supply necessary to correct the color of the stock in accordance with predetermined standards. Mechanical linkage 48 is an alternative means for altering the wiper position by suitable coupling to rotatable shaft 44. The flow meter control, however, has advantages of greater accuracy and automatic system adaptation to variations in density or other factors affecting the flow of additive through valve 16.

Figure 2:
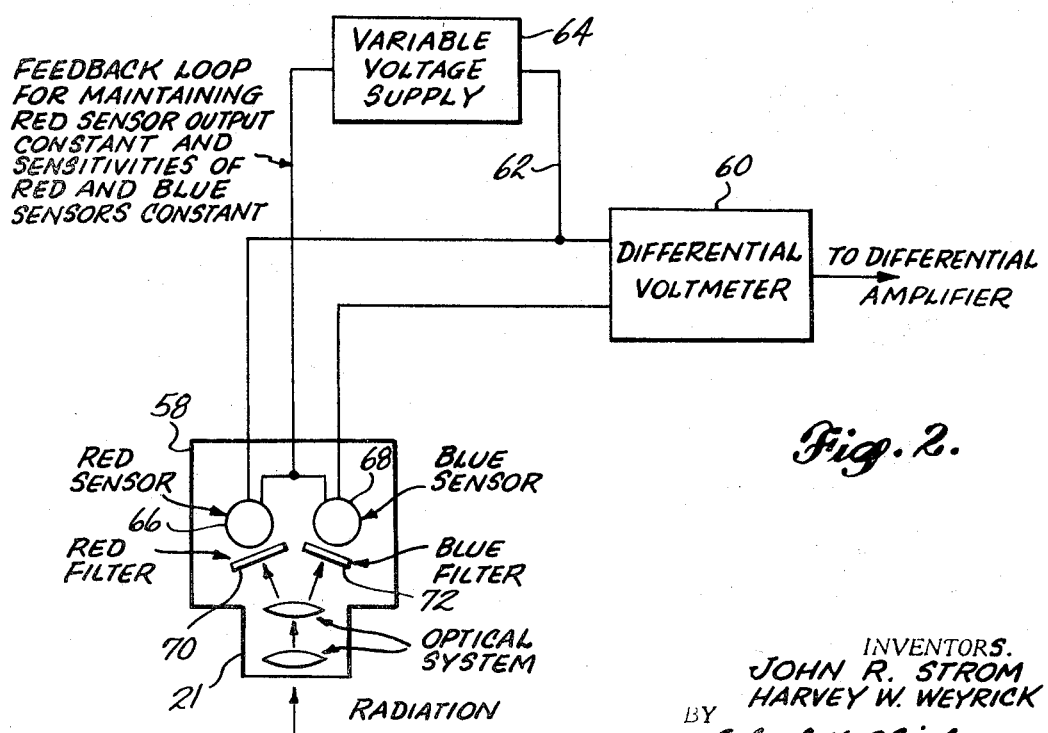
FIGURE 2 is a block diagram of the multiple-band chromatic sensor of FIGURE 1.

The preferred form of chromatic sensor shown in FIGURE 2 includes a sensor head 58, a differential voltmeter 60 and a feed back loop 62 including a variable voltage supply 64. This device of a known type automatically and continuously monitors the color of light received through the optical system 21 by monitoring two of the three primary colors, namely red and blue, in a pair of essentially identical photodetectors 66 and 68, respectively. Red and blue light is admitted to the detectors by red and blue filters 70 and 72 passing respective wavelength bands centered at approximately 0.65 and 0.45 microns. The detectors may be photomultiplier tubes or other suitable photosensitive devices, and their respective outputs are applied to differential voltmeter 60.

Variable voltage supply 64 includes means for maintaining constant the voltages applied to detectors 66 and 68, whereby their sensitivities are maintained constant, and further includes means connected to the output of red detector 66 for maintaining its output constant so that the differential voltmeter output represents a ratio of the intensities of light received by the detectors. In one known form of this type of chromatic sensor a servo mechanism is also provided for controlling a variable iris opening (not shown) in the optical system to maintain roughly constant the amount of light received by the red tube at the same time that the sensitivities of the detectors are maintained constant by the electronic feedback loop, thereby further increasing the accuracy of the color signal output.

Figure 3:
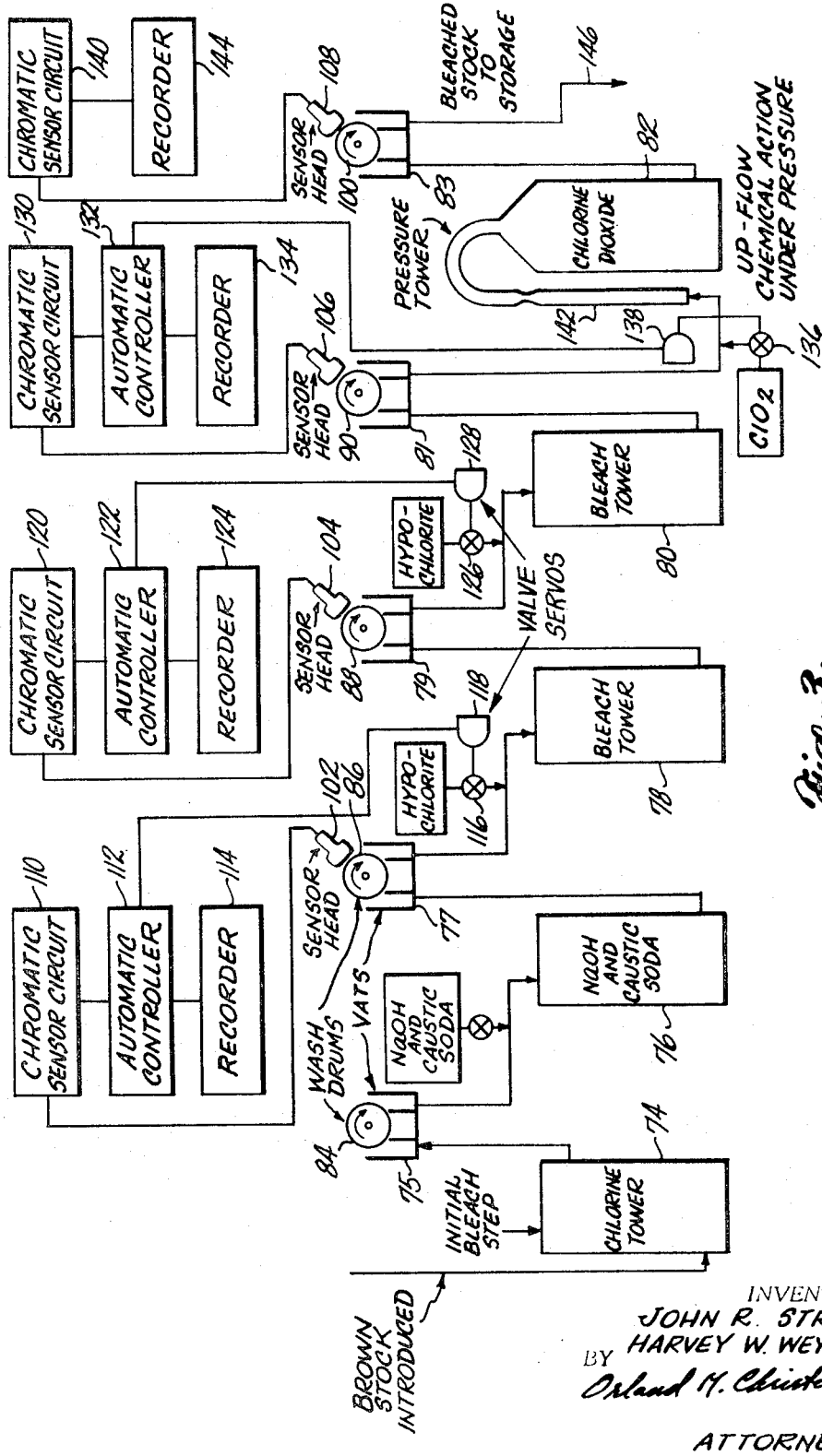
FIGURE 3 is a flow diagram of a typical pulp manufacturing process coupled with a block diagram of a control system adapted to the process according to the invention.

While the control system according to the invention is suitable for application and adaptation to any of different chemical processes wherein color is monitored as a critical factor in the process, pulp manufacturing is typical. Progressive bleaching of the pulp can be closely controlled by monitoring the color of stock as it is treated in various stages. In the flow diagram of FIGURE 3 brown stock or pulp is introduced at the left and is pumped into an initial chlorine bleach tower 74 from which it is introduced successively and alternately into vats 75, 77, 79, 81 and 83, and additional bleach towers 76, 78, 80 and 82. The initial bleach step takes place by injection of chlorine into the first tower 74 from which the slurry is pumped into vat 75 and passed across a rotating washing drum 84 of a known type including means for washing the stock as it passes over the drum and vacuum means within the drum for withdrawing the water. Typically, sodium hydroxide or "caustic soda" is then added and mixed prior to entry of the stock into the second treating tower 76 from which it is pumped to a second vat 77 and again washed as it is passed across a second rotating drum 86.

Automatic control of the process begins at this stage where a sensor head 102 of the type previously described is placed in close proximity with the mat or web of stock as it is passing across the drum following washing. The output of the sensor head is fed to the chromatic sensor circuit 110 which includes the differential voltmeter and feedback circuitry described in connection with FIGURE 2.

The automatic controller 112, which includes the amplifier and comparator circuitry 34 (FIGURE 1) and the adjustable reference voltage source 56 and potentiometer 54, controls valve means 116 through servo means 118 injecting hypochlorite solution into the stock as it passes to bleach tower 78. Here it is permitted to remain for a period of time during chemical reaction of the bleach. The partially bleached stock is then passed to a third vat 79 for further washing on drum 88 and its color is again monitored by sensor head 104 and chromatic sensor circuit 120. Automatic controller 122 controls injection of a further amount of hypochlorite bleach through valve means 126 actuated by servo means 128. Recorders 114 and 124 of a suitable type such as a strip chart recorder make available for visual observation the effect of bleach being automatically added in the previous stages.

From bleach tower 80 the stock is passed to a fourth vat 81, is washed as it crosses drum 90 and is monitored again by sensor head 106 to which the chromatic sensor circuit 130 is connected. Controller 132 and servo means 138 actuate a valve 136 introducing chlorine dioxide into the stock prior to entry thereof into a pressure tower 142 and subsequent settling tower 82 for final treatment of the bleach in a known manner. A final washing step is performed in vat 83 on drum 100 and final monitoring is performed by sensor head 108 and chromatic sensor circuit 140 whereby the final stage of the process may be recorded and observed on recorder 144 prior to passage of the bleached stock to storage through output 146.

It will be observed that in each stage of the process the control means according to the invention introduces additional chemical additive into the flow of stock at a location immediately downstream of the monitoring point in a "feed forward" fashion. Second and subsequent sensors and controllers monitor and control subsequent stages of the process following passage of the stock through a sufficient time-distance for the intervening chemical activity to run its course. At each stage the response of the servo control is accurately calibrated in accordance with various process variables as previously discussed whereby the entire process may be gauged more accurately and scientifically than heretofore possible.

What is claimed is:

1. Apparatus for controlling additive injection in the treatment of continuously moving stream of material comprising
    means for directing radiant energy onto said material,
    first sensing means for detecting the intensity of reflected radiant energy within a first narrow band of wavelengths and producing a first electrical signal corresponding thereto,
    second sensing means for detecting the intensity of reflected radiant energy within a second narrow band of wavelengths and producing a second electrical signal corresponding thereto,
    electrical circuit means responsive to said first and second signals for producing a third electrical signal representing a predetermined composite function of said first and second signals,
    control means responsive to said third signal for controlling the injection of said additive to said material, and injection means responsive to said control means for injecting said additive into said stream of material downstream from said first and second sensing means in accordance with said third signal.

2. Apparatus for controlling additive injection in the treatment of a continuously moving stream of material which has radiant energy directed thereon comprising first sensing means for detecting the intensity of reflected radiant energy within a first narrow band of wavelengths and producing a first electrical signal corresponding thereto, second sensing means for detecting the intensity of reflected radiant energy within a second narrow band of wavelengths and producing a second electrical signal corresponding thereto, electrical circuit means responsive to said first and second signals for producing a third electrical signal representing a predetermined composite function of said first and second signals, reference means having selectable output levels corresponding to predetermined rates of additive injection, means for comparing said third signal within the output level of said reference means and producing a fourth electrical signal in accordance with said comparison, control means responsive to said fourth signal for controlling the injecting of said additive to said material, and means coupled to said means for comparing and responsive to variations in additive injection for selecting an output level in said reference means in accordance with said variations in additive injection.

3. The apparatus of claim 2 wherein said electrical circuit means comprises a differential voltmeter having first and second inputs for receiving said first and second electrical signals, and feedback means connected between the inputs of said first and second sensing means and the output of one of them to maintain the output of said one sensing means constant, whereby the differential voltmeter output represents a ratio of said first and second signals.

4. The apparatus of claim 2 wherein said first and second sensing means are located upstream from the point of additive injection.

5. The apparatus of claim 4 wherein said reference means comprises a potentiometer with means for adjusting the voltage range thereof and having a wiper for selecting output levels within said voltage range, and means for positioning said wiper in accordance with changes in said injection rate.

6. The apparatus of claim 5 wherein said additive is injected in fluid form and wherein said means for positioning said wiper includes a flow meter for monitoring the injection rate.

7. The apparatus of claim 4 comprising means for directing radiant energy onto said material, said means including first and second radiant energy emitters, and first and second radiant energy filters coupled to said first and second emitters for defining and balancing respective bands of wavelengths directed onto said material.

8. A system including a plurality of treating means for the treatment of a continuously moving stream of material with additive injection each treating means including an apparatus as defined in claim 4, there being a sufficient time-distance spacing between adjacent treating means to permit the required effect of injected additive.

9. The system of claim 8 comprising means for adjusting the selectable output levels of said reference means in each apparatus.

References Cited

UNITED STATES PATENTS

| | | | |
|---|---|---|---|
| 3,197,644 | 7/1965 | Etzrodt | 250—218 |
| 3,272,691 | 9/1966 | Shera | 162—238 X |
| 3,340,764 | 9/1967 | Bergson | 250—222 X |
| 3,322,616 | 5/1967 | Hutchinson et al. | 162—61 |

S. LEON BASHORE, Primary Examiner

R. D. BAJEFSKY, Assistant Examiner

U.S. Cl. X.R.

68—27, 207; 250—222; 162—17, 19, 252, 238